United States Patent
Acharya

(10) Patent No.: US 7,680,054 B1
(45) Date of Patent: Mar. 16, 2010

(54) ARRANGEMENT FOR SWITCHING INFINIBAND PACKETS USING SWITCHING TAG AT START OF PACKET

(75) Inventor: Yatin Acharya, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1906 days.

(21) Appl. No.: 09/905,067

(22) Filed: Jul. 16, 2001

(51) Int. Cl.
*G01R 31/08* (2006.01)

(52) U.S. Cl. ................. 370/238; 370/389; 370/254; 709/238; 709/245

(58) Field of Classification Search ......... 370/254–255, 370/232, 338, 469–472, 351, 389, 392–393; 340/825.52
See application file for complete search history.

(56) References Cited

U.S. PATENT DOCUMENTS

| | | | | |
|---|---|---|---|---|
| 6,430,155 | B1 * | 8/2002 | Davie et al. ................. | 370/232 |
| 6,499,061 | B1 * | 12/2002 | Benayoun et al. ........... | 709/245 |
| 6,643,269 | B1 * | 11/2003 | Fan et al. .................... | 370/254 |
| 2002/0165978 | A1 * | 11/2002 | Chui .......................... | 709/238 |

OTHER PUBLICATIONS

Infiniband™ Architecture vol. 1, Release 1.0, Oct. 24, 2000, pp. 1-880.

Daniel Cassiday, InfiniBand™ Architecture Tutorial, Hot Chips, Aug. 2000, Sun Microsystems, 79 pages.

* cited by examiner

*Primary Examiner*—Robert W Wilson
(74) *Attorney, Agent, or Firm*—Manelli Denison & Selter PLLC; Leon R. Turkevich

(57) ABSTRACT

A network manager, configuring for detecting network nodes and configuring network switches, determines addressing field lengths to be used for addressing the network nodes and switching data packets between the network nodes based on the number of detected network nodes. The network manager detects the network nodes by exploring the network according to prescribed explorer procedures. The network manager selects a size of address fields to be used for switching data packets traversing the network, based on the number of detected network nodes. The network manager configures each network switch within the network to switch the data packets based on a switching tag having the selected size and positioned at the start of the packet. Hence, each network switch is able to generate forwarding decisions based on the switching tag at the beginning of each received data packet. The switching tag is distinct from, and substantially smaller than, the existing destination address field. Hence, switching complexity can be minimized for relatively small networks having minimal addressing requirements, reducing latency and simplifying forwarding decisions within the network switches.

15 Claims, 3 Drawing Sheets

Local Route Header, 40    FIG. 3A
(PRIOR ART)

ARRANGEMENT FOR SWITCHING INFINIBAND PACKETS USING SWITCHING TAG AT START OF PACKET

BACKGROUND OF THE INVENTION

1. Field of the Invention

The present invention relates to initialization and management of switching operations in an InfiniBand™ server system.

2. Background Art

Networking technology has encountered improvements in server architectures and design with a goal toward providing servers that are more robust and reliable in mission critical networking applications. In particular, the use of servers for responding to client requests has resulted in a necessity that servers have an extremely high reliability to ensure that the network remains operable. Hence, there has been a substantial concern about server reliability, accessibility, and serviceability.

In addition, processors used in servers have encountered substantial improvements, where the microprocessor speed and bandwidth have exceeded the capacity of the connected input/out (I/O) buses, limiting the server throughput to the bus capacity. Accordingly, different server standards have been proposed in an attempt to improve server performance in terms of addressing, processor clustering, and high-speed I/O.

These different proposed server standards led to the development of the InfiniBand™ Architecture Specification, (Release 1.0), adopted by the InfiniBand™ Trade Association. The InfiniBand™ Architecture Specification specifies a high-speed networking connection between central processing units, peripherals, and switches inside a server system. Hence, the term "InfiniBand™ network" refers to a network within a server system. The InfiniBand™ Architecture Specification specifies both I/O operations and interprocessor communications (IPC).

A particular feature of InfiniBand™ Architecture Specification is the proposed implementation in hardware of the transport layer services present in existing networking protocols, such as TCP/IP based protocols. The hardware-based implementation of transport layer services provides the advantage of reducing processing requirements of the central processing unit (i.e., "offloading"), hence offloading the operating system of the server system.

The InfiniBand™ Architecture Specification describes a network architecture, illustrated in FIG. 1. The network 10 includes nodes 11, each having an associated channel adapter 12 or 14. For example, the computing node 11a includes processors 16 and a host channel adapter (HCA) 12; the destination target nodes 11b and 11c include target channel adapters 14a and 14b, and target devices (e.g., peripherals such as Ethernet bridges or storage devices) 18a and 18b, respectively. The network 10 also includes routers 20, and InfiniBand™ switches 22.

Channel adapters operate as interface devices for respective server subsystems (i.e., nodes). For example, host channel adapters (HCAs) 12 are used to provide the computing node 11a with an interface connection to the InfiniBand™ network 10, and target channel adapters (TCAs) 14 are used to provide the destination target nodes 11b and 11c with an interface connection to the InfiniBand™ network. Host channel adapters 12 may be connected to a memory controller 24 as illustrated in FIG. 1. Host channel adapters 12 implement the transport layer using a virtual interface referred to as the "verbs" layer that defines in the manner in which the processor 16 and the operating system communicate with the associated HCA 12: verbs are data structures (e.g., commands) used by application software to communicate with the HCA. Target channel adapters 14, however, lack the verbs layer, and hence communicate with their respective devices 18 according to the respective device protocol (e.g., PCI, SCSI, etc.).

However, arbitrary hardware implementations may result in substantially costly hardware designs. In particular, implementation of the InfiniBand™ network may require relatively complex switches 22 having substantial processing capacity to support the large address ranges specified by the InfiniBand™ Architecture Specification. For example, packets are switched based on Destination Local Identifiers (DLIDs) and Source Local Identifiers (SLIDs), referred to generically as Local Identifiers (LIDs). The InfiniBand™ Architecture Specification specifies each LID as a 16-bit value, enabling unique addressing in each subnet on the order of 48 k addresses unicast, and 16 k multicast (total 64 k address range). However, such complex addressing schemes result in large memory requirements for the InfiniBand™ network switches. Hence, the InfiniBand™ network switches may have a substantially high cost that often will cause entry-level business users to delay deployment due to economic concerns.

SUMMARY OF THE INVENTION

There is a need for an arrangement that enable entry-level business users to deploy an InfiniBand™ network with minimal expense.

There also is a need for an arrangement that enables InfiniBand™ network management to activate subnetworks according to reduce addressing requirements for relatively small scale networks having a limited number of network nodes, which would significantly improve network performance in terms of reduced latency and reduced amount of packet processing at all the intermediate nodes.

There also is a need for an arrangement that enables switching resources to be optimized in an InfiniBand™ network.

These and other needs are attained by the present invention, where a network manager, configuring for detecting network nodes and configuring network switches, determines addressing field lengths to be used for addressing the network nodes and switching data packets between the network nodes based on the number of detected network nodes. The network manager detects the network nodes by exploring the network according to prescribed explorer procedures. The network manager selects a size of address fields to be used for switching data packets traversing the network, based on the number of detected network nodes. The network manager configures each network switch within the network to switch the data packets based on a switching tag having the selected size and positioned at the start of the packet. Hence, each network switch is able to generate forwarding decisions based on the switching tag at the beginning of each received data packet. The switching tag is distinct from, and substantially smaller than, the existing destination address field. Hence, switching complexity can be minimized for relatively small networks having minimal addressing requirements, reducing latency and simplifying forwarding decisions within the network switches.

One aspect of the present invention provides a method. The method includes detecting network nodes on the network by a network manager, selecting by the network manager a size of address fields to be used for switching data packets traversing the network, based on a number of the detected network nodes, and configuring each network switch. The network manager configures each network switch of the network to switch each of the data packets based on a corresponding switching tag, added to a start of the corresponding data packet and having the selected size.

Another aspect of the present invention provides a network manager. The network manager includes an explorer resource configured for detecting network nodes on the network, and a controller. The controller is configured for selecting a size of address fields to be used for switching data packets traversing the network, based on a number of the detected network nodes. The controller configures each network switch of the network to switch each of the data packets based on a corresponding switching tag, added to a start of the corresponding data packet and having the selected size.

Still another aspect of the present invention provides a network within a server system. The network includes a plurality of network switches configured for switching data packets, and a network manager. The network manager is configured for detecting network nodes, including the network switches, within the prescribed subnetwork. The network manager selects a size of address fields to be used for switching the data packets, based on a number of the detected network nodes. The network manager configures the network switches to switch each of the data packets based on a corresponding switching tag added to a start of the corresponding data packet and having the selected size, each network switch switching a received data packet based on the corresponding switching tag.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein:

FIGS. 3A and 3B are diagrams illustrating a conventional InfiniBand™ packet and an InfiniBand™ packet having an added switching tag at the start of the packet, respectively, according to an embodiment of the present invention.

BEST MODE FOR CARRYING OUT THE INVENTION

Figure 1:
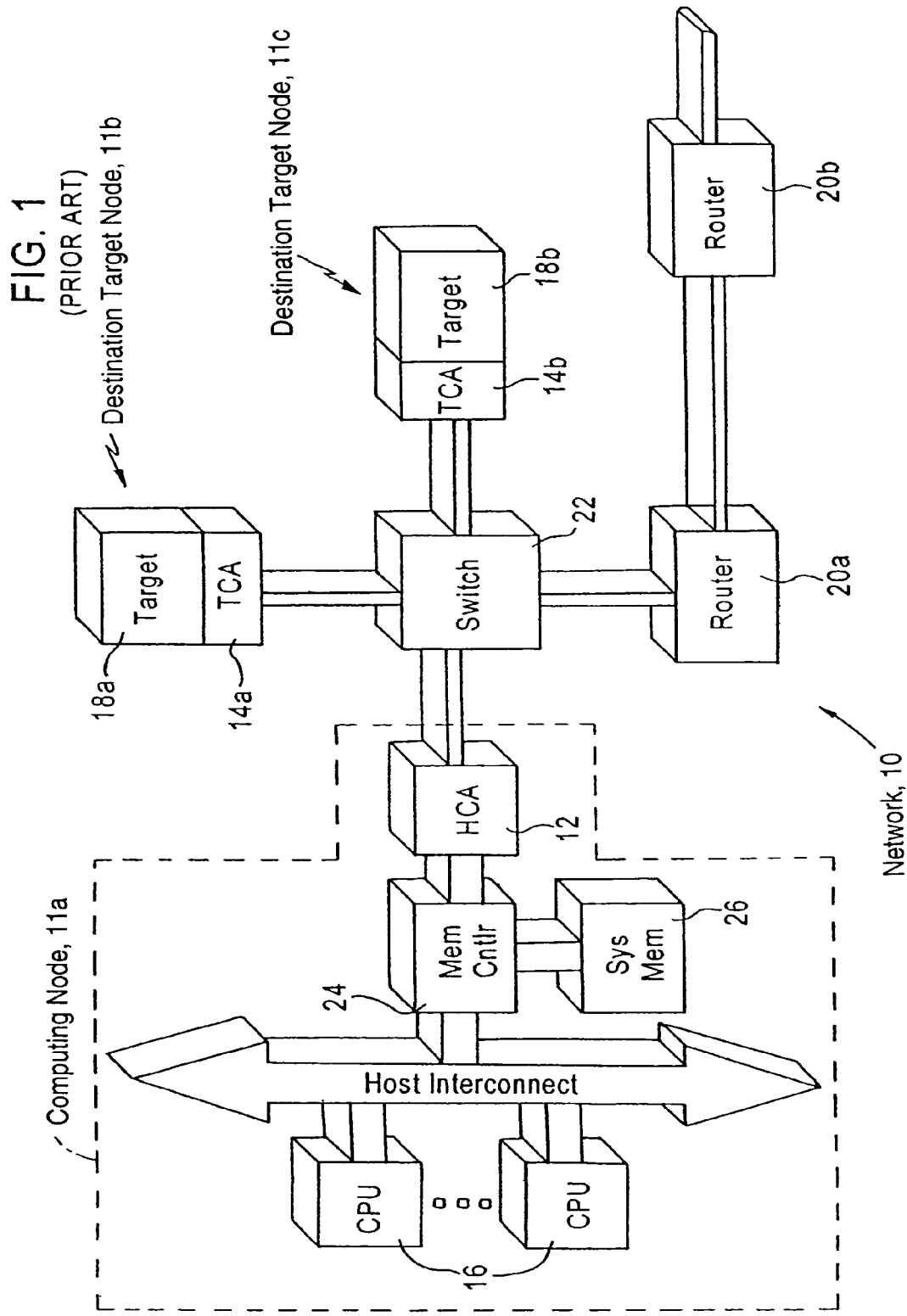
FIG. 1 is a diagram illustrating a conventional network according to the InfiniBand™ Architecture Specification.
Figure 2:
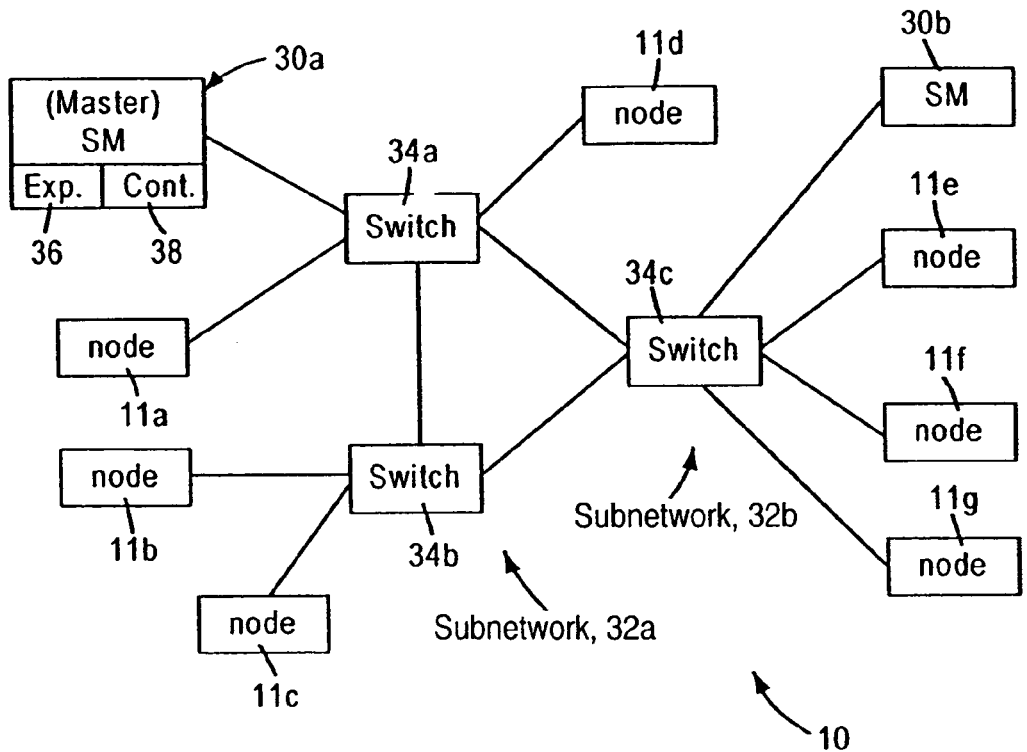
FIG. 2 is a diagram illustrating an InfiniBand™ network having a subnetwork configured for selective address size addressing, according to an embodiment of the present invention.

FIG. 2 is a diagram illustrating an InfiniBand™ network 10 having a subnetwork manager 30, also referred to as a network manager, configured for detecting network nodes (e.g., HCAs, TCAs, routers, and switches) within a prescribed subnetwork 32 for selective address size addressing using a switching tag added at the beginning of a packet, according to an embodiment of the present invention. In particular, each subnetwork 32 includes a group of nodes 11 (e.g., HCAs, TCAs, routers), a subnetwork manager 30, and at least one switch 34; as illustrated in FIG. 2, the subnetwork 32a includes the subnetwork manager 30a, switches 34a and 34b, and nodes 11a, 11b, 11c, and 11d; the subnetwork 32b includes the subnetwork manager 30b, switch 34c and nodes 11e, 11f, and 11g. If multiple subnetworks are deployed within the network 10, as illustrated in FIG. 2, one of the subnetwork managers 30 is identified as a master subnetwork manager, which performs the disclosed address field size selection while the remaining subnetwork managers remain in a standby state. As will be apparent from review of the specification, however, the arrangement for selective address size can be implemented using a single subnetwork. In addition, the following description assumes any one of the subnetwork managers 30 can be configured as a master subnetwork manager.

Each subnetwork manager 30 includes an explorer resource 36 configured for detecting the network nodes (including the generic network nodes 11, the switches 34, and other managers 30) using prescribed subnet discovery techniques. For example, each subnetwork manager 30 is configured for determining network paths for each of the reachable network nodes, and port configurations for each of the switches 34. Each subnetwork manager 30 also includes a controller 38 configured for determining the size of the address fields, configuring each of the switches 34, and activating the corresponding subnetwork 32.

FIG. 3A is a diagram illustrating a local route header (LRH) 40 of a conventional data packet transmitted according to InfiniBand™ (IBA) network protocol. Local route headers 40 are positioned at the beginning of a packet and are used to route packets within subnetworks 32. The LRH 40 includes a 4-byte virtual lane (VL) field 42 that specifies the virtual lane to be used. The LRH 40 also includes: a 4-byte version (Ver) field 44 specifying the LRH version, a two-byte next header (NH) field 46 that specifies the next type of header to be received (e.g., IBA transport, IPv6 (raw), Ethertype (raw), etc.); a 4-byte service level (SL) field 48, a 2-byte reserved field 50, a 16-byte destination local identifier field (DLID) 52; a 5-byte second reserved field 54; an 11-byte packet length field 56, and a 16-byte source local identifier field (SLID) 58. Conventional switching operations would require address tables capable of processing the entire 16-bit address space, resulting in substantially large processing requirements such as memory size and processing speed.

Figure 3B:
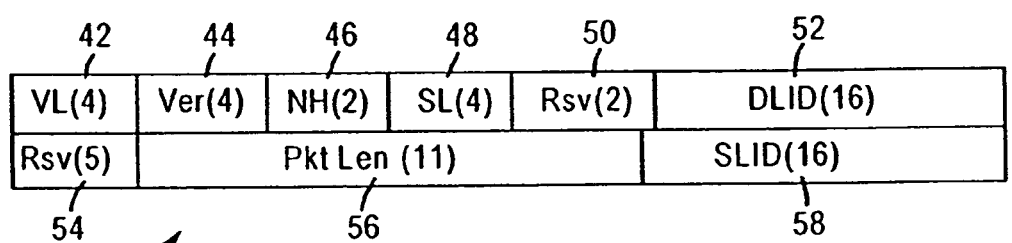
Figure 3B:
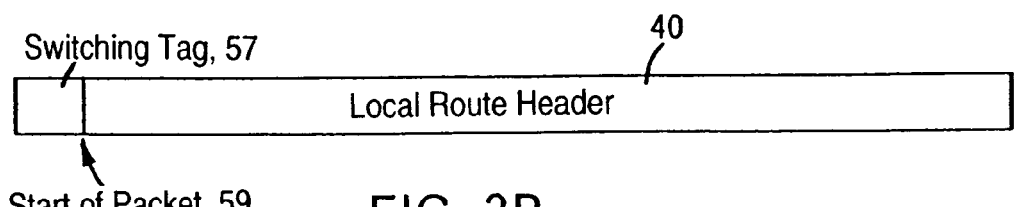

According to the disclosed embodiment, a switching tag 57 is added to the start 59 of the data packet as illustrated in FIG. 3B, having a minimal size determined by the subnet manager 30. In particular, the subnet manager 30, upon determining the address range for the network 10, configures each of the network switches 34 to utilize the switching tag 57 having the selected number of bits based upon the address range. Hence, each network switch 34 can generate address lookup tables based on the size of the switching tag; in addition, positioning the switching tag 57 at the start 59 of the data packet enables frame forwarding decisions to be initiated once the switching tag portion 57 of the data packet has been received.

Figure 4:
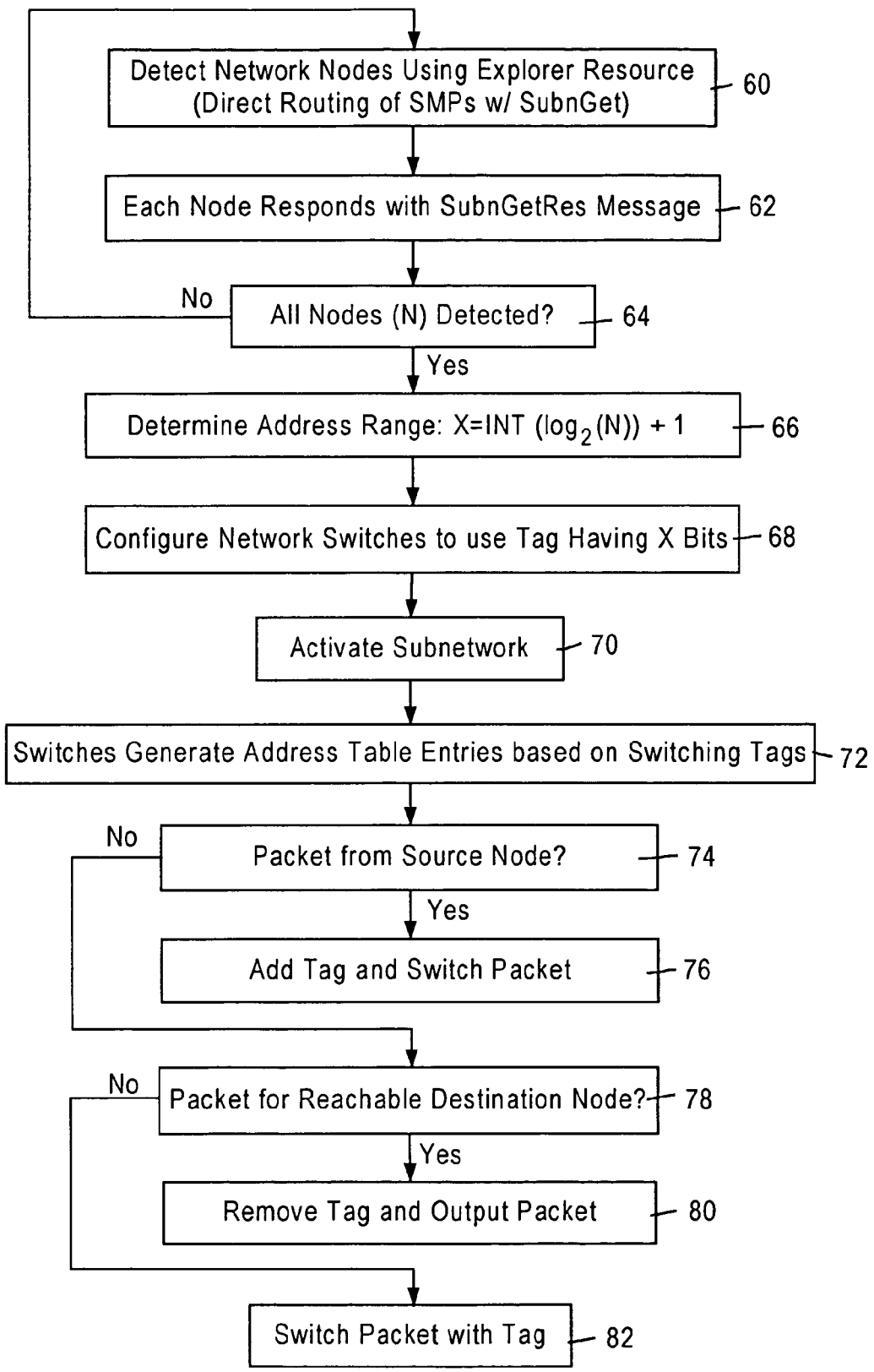
FIG. 4 is a diagram illustrating the method of configuring the subnetwork of FIG. 2 for selective address size addressing, according to an embodiment of the present invention.

FIG. 4 is a diagram illustrating the method of selecting an address size and configuring the network switches 34 for switching data packets according to the selected address size (X), according to an embodiment of the present invention. According to the disclosed embodiment, the size (X) of the switching tag 57 is selected by the master subnetwork manager 30 (e.g., 30a) during initialization of the subnetwork 32. In particular, the explorer resource 36 of the master subnetwork manager 30a detects in step 60 the network nodes (including the generic nodes 11 and the switches 34) by direct routing of subnet management packets (SMPs) including a SubnGet message for obtaining network node information. Each network node (e.g., switch, router, and channel adapter) in the network 10 includes a subnet management agent (SMA) responsive to SMPs, enabling communication between the subnetwork manager 30 and the corresponding network node. The SMA for each network node receiving the SMP responds in step 62 by outputting a SubnGetResp message. The explorer resource 36 continues to output SMPs using direct routing as the subnet topology and capabilities are determined, until all the nodes have been detected in step 64.

Once all the network nodes have been detected, the controller 38 of the master subnetwork manager 30 selects in step 66 the size of the address fields (X) to be used for switching data packets based on the number (N) of detected network nodes. For example, the controller 38 determines the size of the address fields (X) based on the addressable range, where $X = INT(\log_2(N)) + 1$.

The controller 38 then configures in step 68 each of the network switches 34 by outputting SMPs to each of the switches that specifies that switching tags 57 having the prescribed number of bits (X) are to be used for switching. Once the network switches 34 have been configured, the master subnetwork manager 30 outputs in step 70 a management datagram (MAD) for activation of the subnetwork, enabling the switches 34 to generate in step 72 address table entries based on the switching tags 57 having the specified size (X).

For example, each switch 34 having received a data packet checks in step 74 whether the data packet was received from a source node 11 having generated the data packet, as opposed to another network switch 34. If the switch 34 determines that the packet was from a source node 11, the switch 34 adds in step 76 the switching tag 57 based on the DLID 52 within the data packet. For example, the network switch 34 may generate the switching tag 57 by selecting the least significant number of X bits from the DLID field 52, although other arrangements may be implemented. After adding the switching tag 57, the switch 34 having received the data packet outputs the data packet to another switch 34.

If in step 74 the network switch 34 determines the packet is not from a source node (i.e., received from another switch 34), the network switch 34 determines in step 78 whether the packet is for a reachable destination node 11 that does not require transfer to another network switch 34. If in step 78 the data packet is to be output to the destination node 11, the network switch 34 removes in step 80 the switching tag 57, and outputs the packet to the destination node 11. However if the data packet is to be forwarded to another network switch 34, the network switch switches the data packet in step 82 with the switching tag 57.

According to the disclosed embodiment, switching operations are optimized by adding a switching tag 57, enabling switching operations to be performed upon receiving a prescribed minimum number of bits of the incoming data packet. In addition, the sizes of address tables can be substantially reduced. Various modifications are contemplated, for example configuring each network node 11 to generate the necessary switching tag 57, eliminating the necessity that a network switch 34 removes the tag 57; rather, the destination network node 11 may strip off the switching tag 57 as the data packet is received.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method comprising:
    detecting network nodes on a network by a network manager;
    selecting by the network manager a tag size, as a prescribed number of bits, of an address field of a network to be used for switching data packets traversing the network, based on a number of the detected network nodes, each data packet having a header with content,
    configuring by the network manager each network switch of the network to switch each of the data packets based on a corresponding switching tag, added to a start of the corresponding data packet and the switching tag having the selected tag size of the address field, without altering the content of the header.

2. The method of claim 1, wherein the configuring step includes sending a management datagram to each network switch, the management datagram specifying that switching is to be based on the switching tag, and the selected size of the switching tag.

3. The method of claim 1, wherein detecting step and configuring step each include accessing the network according to InfiniBand™ network protocol.

4. The method of claim 3, further comprising:
    receiving by a first of the network switches an InfiniBand™ packet having a destination local identifier (DLID) specifying a destination node on the network;
    adding by the first network switch a new switching tag to the start of the InfiniBand™ packet and having the selected size, and specifying the destination node based on the DLID; and
    switching the InfiniBand™ packet having the new switching tag to a second of the network switches based on the switching tag.

5. The method of claim 4, further comprising:
    receiving the InfiniBand™ packet including the new switching tag by the second network switch; and
    selectively removing, by the second network switch, the new switching tag from the InfiniBand™ packet based on whether the new switching tag specifies a destination node reachable by the second network switch; and
    selectively outputting the InfiniBand™ packet, following removal of the new switching tag, to the destination node based on the destination node being reachable by the second network switch.

6. The method of claim 5, further comprising selectively outputting, by the second network switch, the InfiniBand™ packet including the new switching tag to a third of the network switches based on a determined unreachability of the destination node by the second network switch.

7. A network manager comprising:
    an explorer resource configured for detecting network nodes on the network; and
    a controller configured for selecting a tag size, as a prescribed number of bits, of address fields of a network to be used for switching data packets traversing the network, based on a number of the detected network nodes, each data packet having a header with content, the controller configuring each network switch of the network to switch each of the data packets based on a corresponding switching tag, added to a start of the corresponding data packet and the switching tag having the selected tag size of the address field, without altering the content of the header.

8. The network manager of claim 7, wherein the network manager is configured for sending a management datagram to each network switch, the management datagram specifying that switching is to be based on the switching tag, and the selected size of the switching tag.

9. The network manager of claim 7, wherein the explorer resource and the controller each are configured for accessing the network according to InfiniBand™ network protocol.

10. A network within a server system, the network comprising:
a plurality of network switches configured for switching data packets; and
a network manager configured for detecting network nodes and the network switches, the network manager configured for selecting a tag size, as a prescribed number of bits, of address fields of a network to be used for switching the data packets, based on a number of the detected network nodes and the detected network switches, each data packet having a header with content, the network manager configured for configuring the network switches to switch each of the data packets based on a corresponding switching tag added to a start of the corresponding data packet and the switching tag having the selected tag size of the address field, each network switch switching a received data packet based on the corresponding switching tag, without altering the content of the header.

11. The network of claim 10, wherein the size corresponds to a selected number of bits.

12. The network of claim 11, wherein each network switch is configured for generating address table entries based on the selected size.

13. The network of claim 11, wherein the at least one network switch and the network nodes are configured for communication according to InfiniBand™ network protocol.

14. The network of claim 11, wherein each network switch is configured for adding a new switching tag to the start of an InfiniBand™ packet received from a network node and having a destination local identifier (DLID) specifying a destination node on the network, the new switching tag specifying the destination node based on the DLID and having the selected size.

15. The network of claim 14, wherein each network switch is configured for selectively removing the new switching tag from the InfiniBand™ packet based on whether the new switching tag specifies a destination node reachable by the corresponding network switch.

* * * * *